(12) United States Patent
Jane Santamaria

(10) Patent No.: US 9,132,849 B2
(45) Date of Patent: Sep. 15, 2015

(54) SUSPENSION FOR BABY PUSHCHAIRS

(71) Applicant: Jane, S.A., Palau de Plegamans (Barcelona) (ES)

(72) Inventor: Manuel Jane Santamaria, Palau de Plegamans (ES)

(73) Assignee: JANE, S.A., Palau de Plegamans (Barcelona) (ES)

( * ) Notice: Subject to any disclaimer, the term of this patent is extended or adjusted under 35 U.S.C. 154(b) by 0 days.

(21) Appl. No.: 14/580,860

(22) Filed: Dec. 23, 2014

(65) Prior Publication Data

US 2015/0197267 A1 Jul. 16, 2015

(30) Foreign Application Priority Data

Jan. 13, 2014 (ES) .................. 201430036 U

(51) Int. Cl.
*B62B 9/18* (2006.01)
*B62B 7/04* (2006.01)

(52) U.S. Cl.
CPC ...................... *B62B 7/04* (2013.01)

(58) Field of Classification Search
CPC ............ B62B 7/00; B62B 7/04; B62B 7/048; B62B 7/06; B62B 9/00; B62B 9/10; B62B 9/12; B62B 9/18; B62B 9/185
USPC ............. 280/642, 647, 650, 657, 658, 47.38, 280/86.1, 124.1, 47.41
See application file for complete search history.

(56) References Cited

U.S. PATENT DOCUMENTS

| 6,449,801 | B1 * | 9/2002 | Durrin .............................. 16/47 |
| 6,663,122 | B1 * | 12/2003 | Lin ............................ 280/47.38 |
| 8,499,898 | B2 * | 8/2013 | Thorne .......................... 188/20 |
| 8,500,152 | B2 * | 8/2013 | Thorne et al. ................. 280/642 |
| 2005/0006863 | A1 * | 1/2005 | Ageneau .................... 280/47.38 |
| 2008/0211206 | A1 * | 9/2008 | Thorne et al. ................. 280/650 |
| 2012/0242050 | A1 * | 9/2012 | Schroeder et al. ............. 280/29 |

* cited by examiner

*Primary Examiner* — John Walters
(74) *Attorney, Agent, or Firm* — Jacobson Holman, PLLC.

(57) ABSTRACT

This invention refers to a suspension for baby pushchairs, characterised in that it has a block that has two suspension elements acting independently, each of which is joined to the support of one of the pushchair wheels. This block is fitted to the chassis of the pushchair. This suspension, of simple and tough appearance, forms a single unit for the two wheels of the baby pushchair, generally the rear wheels, achieving an independent damping for each of them.

4 Claims, 5 Drawing Sheets

Section A-A'

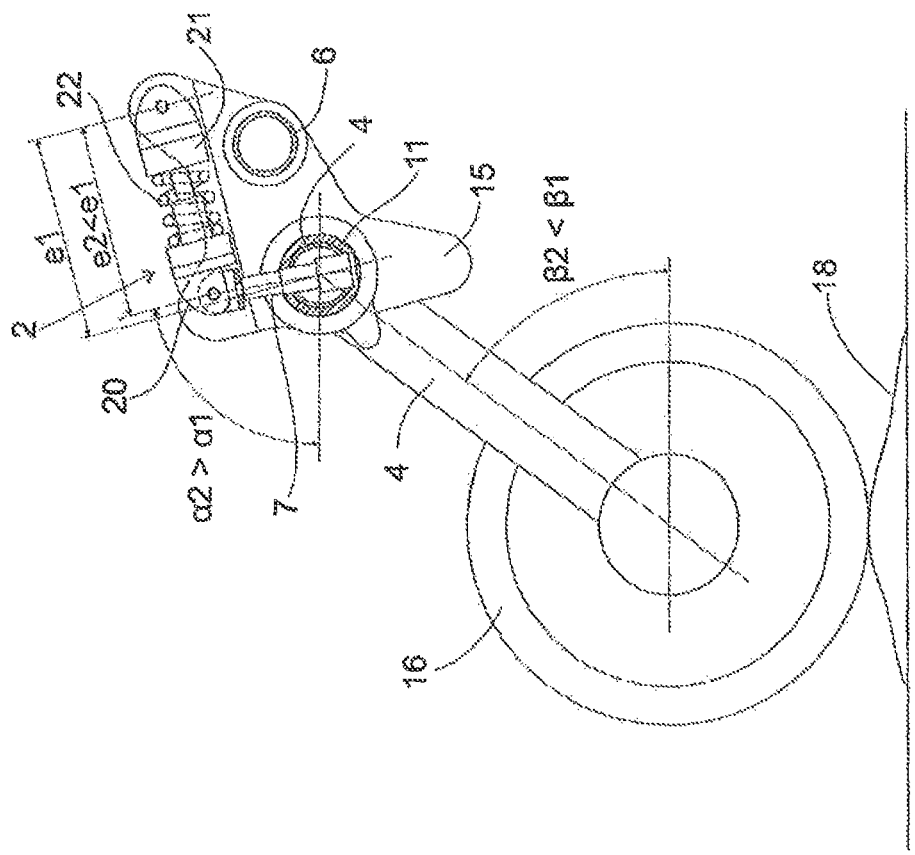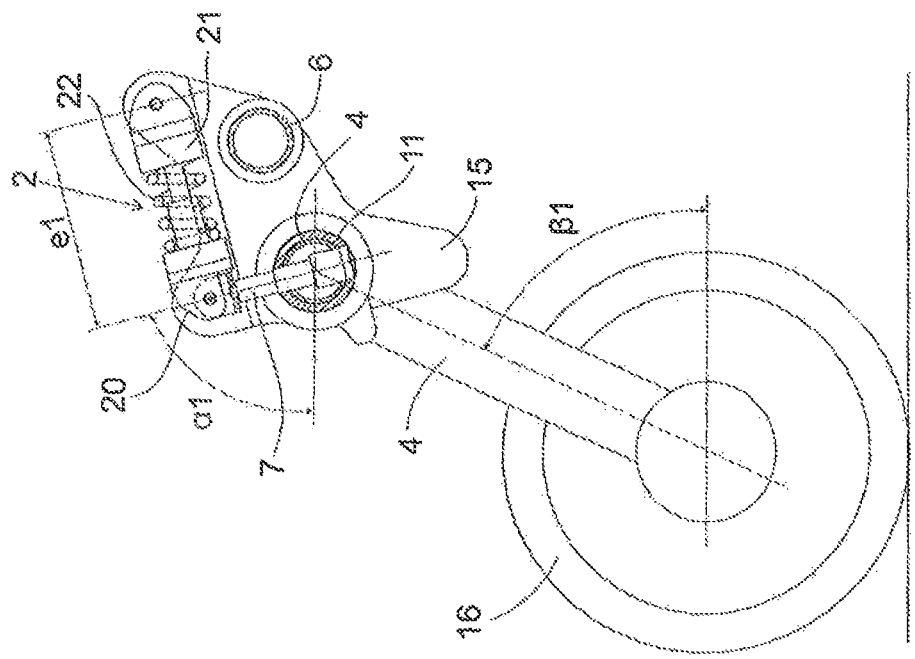

SUSPENSION FOR BABY PUSHCHAIRS

BACKGROUND OF THE INVENTION

Several models of suspension for baby pushchairs exist, based principally on the action of a spring, with the spring being placed, for example between the frame and the wheel bracket, or coupled to a support on one wheel axle. The suspension models currently known are formed by a collection of independent elements for each wheel, generally for the two rear wheels of the baby pushchair.

SUMMARY OF THE INVENTION

This invention consists of a suspension system that is a significant improvement over known models, both in simplicity and toughness, characterised by the fact that it forms a single unit for the two wheels of the baby pushchair, generally the two rear wheels, with independent damping for each of them.

The characteristic feature of this suspension is that it has a block attached to the chassis of the pushchair that comprises two suspension elements preferably one beside the other, each of which is linked to the corresponding pushchair wheel support and acts on the wheel in question independently from the other suspension element. This advantageous suspension layout means that a movement in the left wheel of the pushchair, for example when encountering a pothole or obstacle in its way, it is dampened by the left side suspension element, so that said movement is not transmitted to the right side of the pushchair and vice versa.

The relation between each suspension element with the corresponding wheel support comprises an articulated rod at the rear end of the suspension element, which penetrates and is retained by the corresponding wheel support and is resting on the bottom of the block.

The attachment of the wheel support to the block is made by means of an intermediate bush threaded onto said support and which has a step around it and a transversal opening for the passage of the articulated rod at the rear end of the suspension element.

These and other characterising features will be best made apparent by the following detailed description whose understanding will be made easier by the accompanying five sheets of drawings showing a practical embodiment being cited only by way of example not limiting the scope of the present invention.

DESCRIPTION OF THE DRAWINGS

In the drawings:

FIG. 4A shows a partial view of FIG. 3 with the pushchair wheel in resting position, while FIG. 4B shows the same view, but in working position, where the wheels has risen on encountering a raised element in its way.

DESCRIPTION OF A PREFERRED EMBODIMENT OF THE INVENTION

Figure 1:
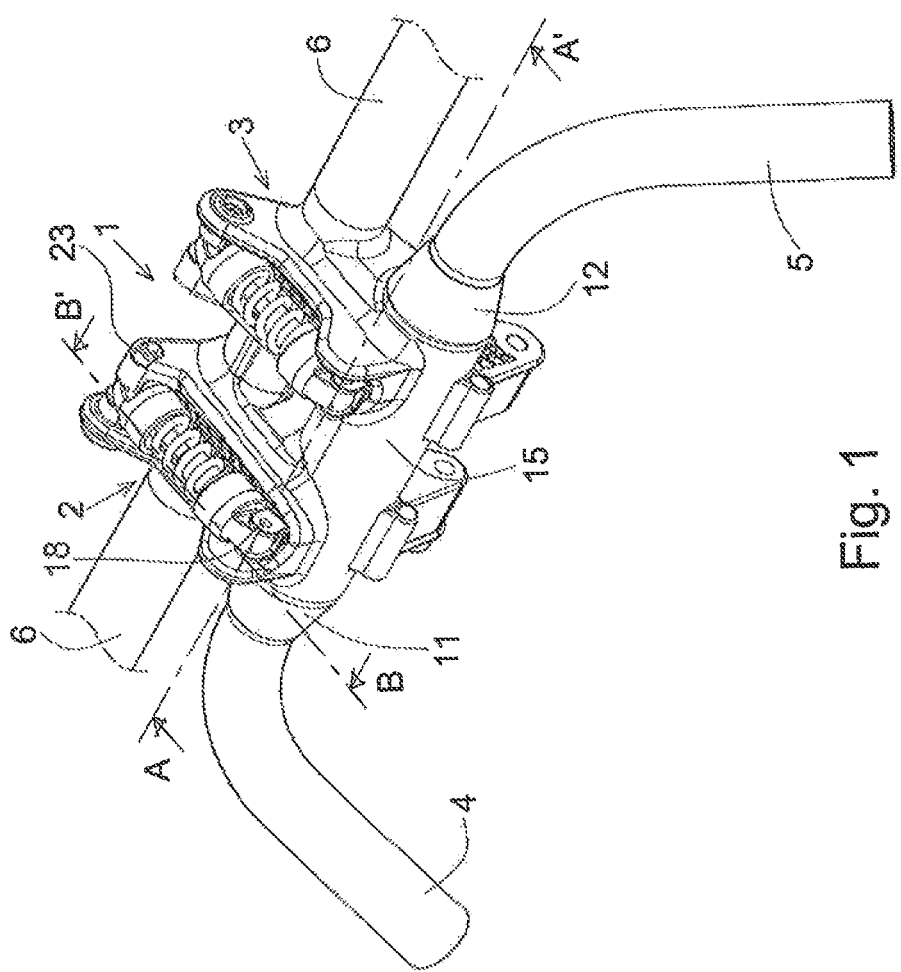
FIG. 1 shows a perspective view of an embodiment of the suspension for baby pushchairs object of the invention.

As can be seen in the drawings, the suspension (1) described in this invention comprises a block (15), the front part of which is attached, by being threaded, onto a transversal element of the pushchair chassis (6).

In this embodiment of the invention, the suspension (1) is attached to the chassis (6) of the pushchair from the front of the block (15), while the rear part of the block (15) retains the supports (4 and 5) of the corresponding wheels (16 and 17), generally for the two rear wheels of the pushchair.

Preferably each of the two pushchair wheel supports (4 and 5) are fitted and retained independently on the block (15), one on each side, without coming into contact with each other, so that one movement of the left side support (4), transmitted by the left side wheel (16), does not interfere with the movement of the right hand support (5), transmitted by the right side wheel (17), and thus guarantees independence between the damping system on the left hand side (2) and the right (3).

This embodiment comprises two rods (7, 8) that are retained at the lower point in the corresponding wheel (16, 17) support (4, 5) and are fitted to the back of the rear part of the block (15), being articulated to the rear end of the suspension element (2, 3).

Figure 2:
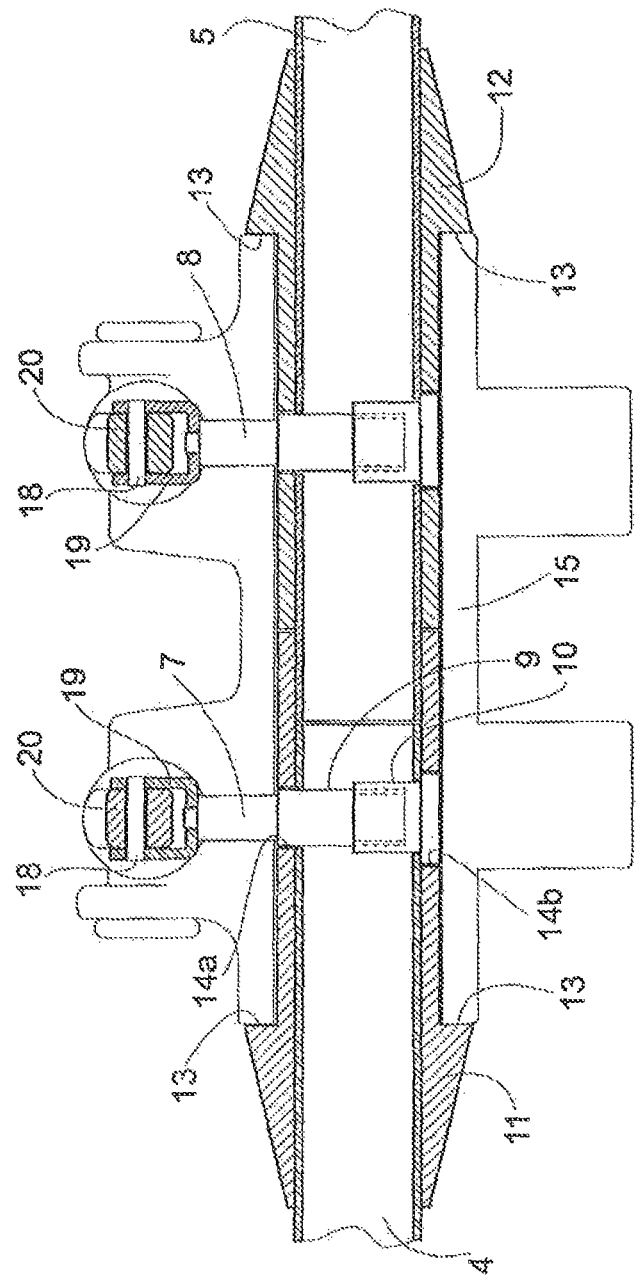
FIG. 2 shows a partial front elevation section view by A-A' of FIG. 1.

To facilitate assembly, the body of the rod (7, 8) can be adjustable in length, for example made up of two telescopic parts (9 and 10) fitted together by means of a threaded joint that enables the length of the red (7, 3) to be adjusted by one part screwing more or less into the other, see FIG. 2.

The attachment of each wheel support (4, 5) to the block (15) is carried out by intermediate bushes (11, 12) threaded onto each support (4, 5), which have a step (13) on their periphery that acts as a stop with the block (15) as well as a transversal opening (14a, 14b) for the rod (7, 8) to pass through, see FIG. 2.

Figure 3:
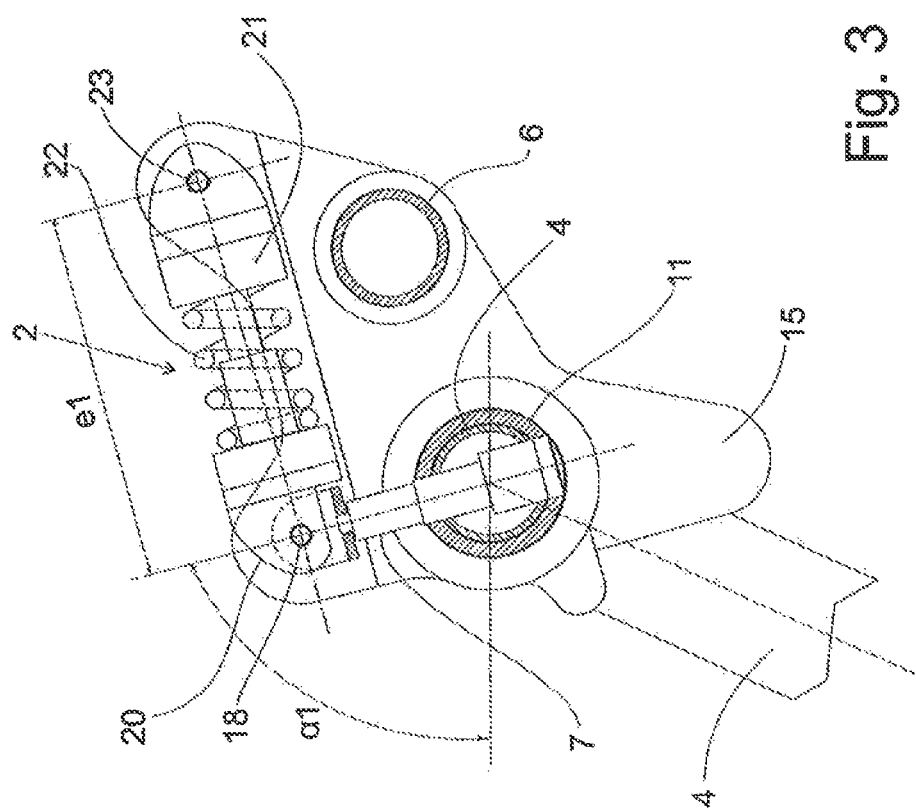
FIG. 3 shows a partial side elevation section view by B-B' of FIG. 1 in a (resting position of the suspension.
Figure 5:
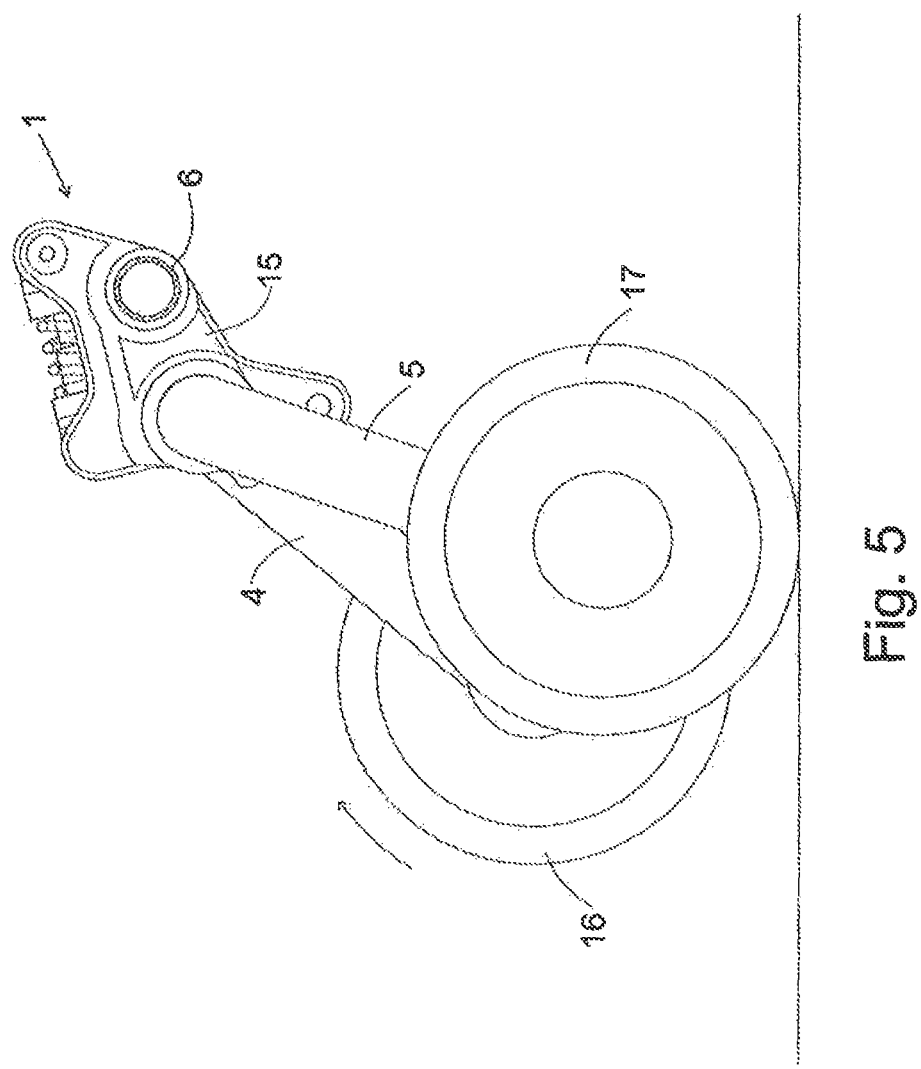
FIG. 5 shows a partial side elevation view of the suspension in working position as in FIG. 4B, and it can be seen that the movement of one wheel is not transmitted to the other pushchair wheel.

As can be seen in FIG. 3, each of the two suspension elements (2 and 3) is made up, for example, of a rear bush (20) that is movable with regard to a front bush (21), this front bush (21) is articulated (23) to the block (15), while the rear bush (20) is joined in an articulation by the articulation rod (18) to the upper part of the rod (7, 8), between the bushes (20, 21) of which there is a spring (22), so that the point of articulation (18) of the rear end of the rear bush (20) with the upper end of the rod (7, 8) is not secured to the block (15), thus enabling the rear bush (20) to move while the front bush (21) remains static, expanding or compressing said spring (22). FIGS. 4A and 4B show how the rod (7) slopes (moving from angle α1 to α2), and moves the rear bush (20) with regards to the block (15), while the front bush (21) remains static, so the distance ("e1") between the articulation shafts (18) and (23) is shortened (distance ("e2")), thus compressing the spring (22).

The invention claimed is:

1. A suspension for baby pushchairs, wherein a block, fitted to a chassis of the pushchair, has two suspension elements acting independently, each of which is joined to a support of one of two pushchair wheels, by means of an articulated rod at a rear end of the suspension element which is retained by a corresponding wheel support and is held at a base of the block, the wheel support being attached to the block with an intermediate bush threaded onto the support and which has a step around the intermediate bush and a transversal opening for passage of the articulated rod.

2. The suspension for baby pushchairs, according to claim 1, wherein each of the two pushchair wheel supports are fitted and retained independently on the block, one on each side, without coming into contact with each other.

3. The suspension for baby pushchairs, according to claim 1, wherein the rods are articulated onto a top end and the rear end of the suspension element, and, at a lower point, the rods are retained by the corresponding wheel support and are fitted to a back of a rear part of the block.

4. The suspension for baby pushchairs, according to claim 2, wherein the body of the rod is adjustable in length.

\* \* \* \* \*